Figure 1:
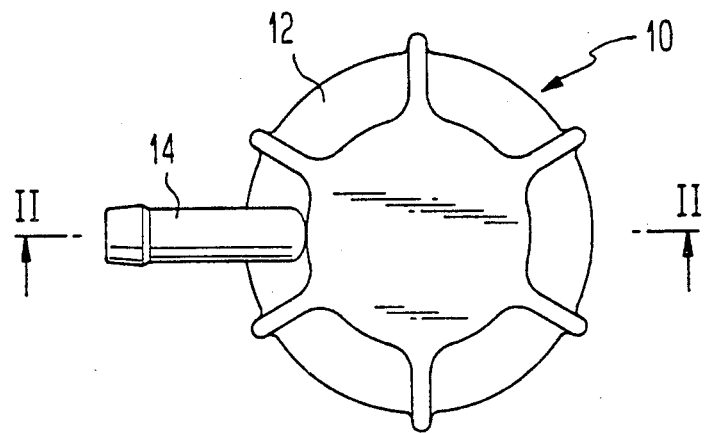

United States Patent

Scharrer

[11] Patent Number: 5,174,463
[45] Date of Patent: Dec. 29, 1992

[54] CAP FOR A CONTAINER, ESPECIALLY A VEHICLE RADIATOR

[75] Inventor: Konrad Scharrer, Hilden, Fed. Rep. of Germany

[73] Assignee: Blau KG Fabrik Fuer Kraftfahrzeugteile, Langenfeld, Fed. Rep. of Germany

[21] Appl. No.: 838,531

[22] Filed: Feb. 19, 1992

[30] Foreign Application Priority Data

Mar. 8, 1991 [DE] Fed. Rep. of Germany ....... 4107525

[51] Int. Cl.$^5$ .............................................. B65D 51/16
[52] U.S. Cl. .................................... 220/203; 220/303; 220/DIG. 32; 137/493.9; 137/512.5; 137/516.27
[58] Field of Search ....... 220/203, 208, 303, DIG. 32; 137/493.9, 512.3, 512.5, 516.27

[56] References Cited

U.S. PATENT DOCUMENTS

| 3,189,213 | 6/1965 | Nimmo | 220/203 |
| 3,820,680 | 6/1974 | Friend | 220/203 |
| 3,937,357 | 2/1976 | Burgess | 220/203 |
| 4,023,583 | 5/1977 | Parkinson | 220/203 X |
| 4,033,475 | 7/1977 | Evans | 220/202 |
| 4,836,406 | 6/1989 | Benning | 220/203 |

Primary Examiner—Allan N. Shoap
Assistant Examiner—Nova Stucker

[57] ABSTRACT

In a closure cap for a container, especially for a vehicle radiator, with an outer part (12), an inner part (16) of cup-shape connected with the outer part and insertable into the opening to be closed, and having an overpressure valve arranged in the inner part for opening and closing a pressure compensation channel running through the inner part (16), which overpressure valve includes an axially movable first valve body (26) which carries a first ring shape substantially radially extending sealing surface (36) biased against a ring-shaped first countersealing surface (48) by a spring urging the first valve body toward the bottom of the inner part (16), the first outwardly directed countersurface (48) is formed by a second valve body (46) movable axially between two end positions, which second valve body has an opening radially inside of the first countersealing surface (48) and radially outside of the first countersealing surface has an inwardly facing second ring-shaped sealing surface (52) and an outwardly facing third ring-shaped sealing surface (58), a respective one of which second and third sealing surfaces in each of the two end positions of the second valve body (46) engages an associated one of second and third countersealing surfaces (54) and (56) provided on the inner part (16).

4 Claims, 4 Drawing Sheets

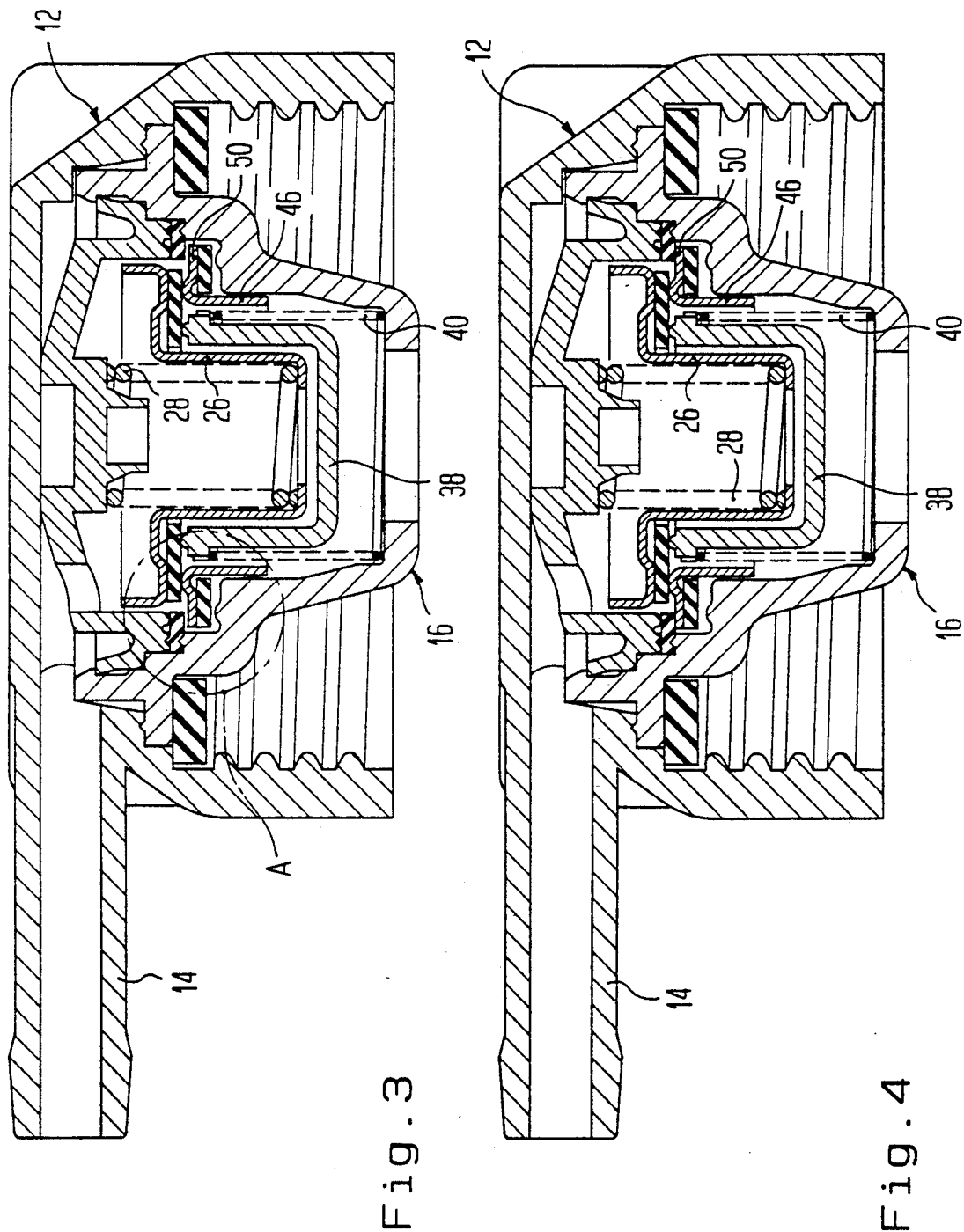

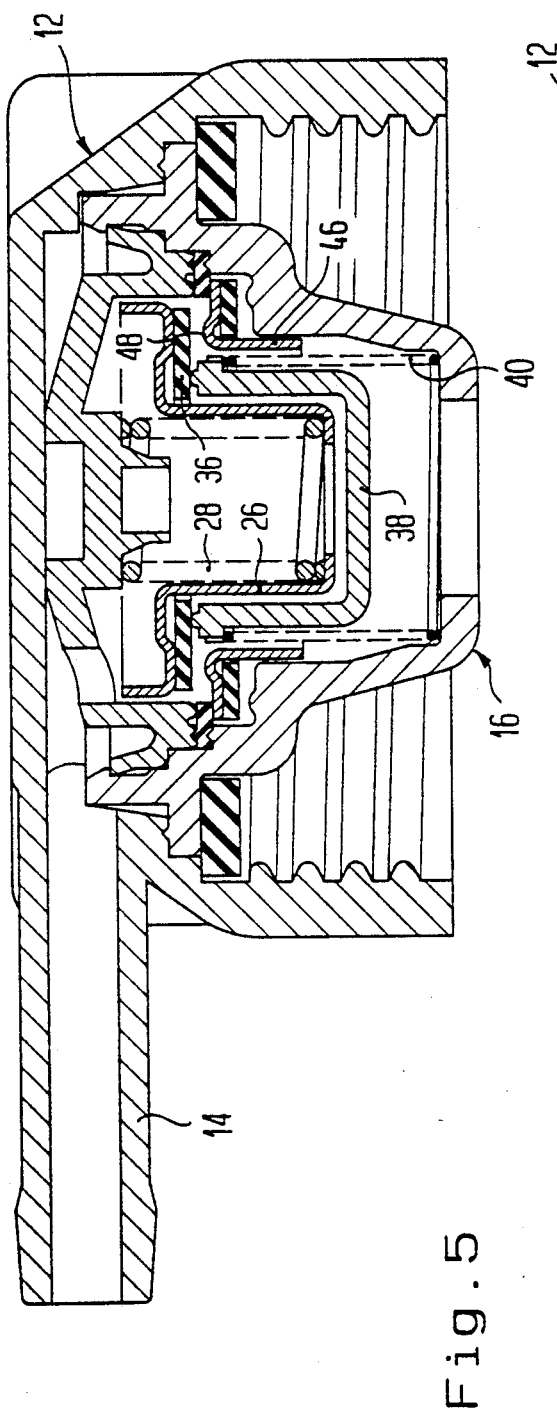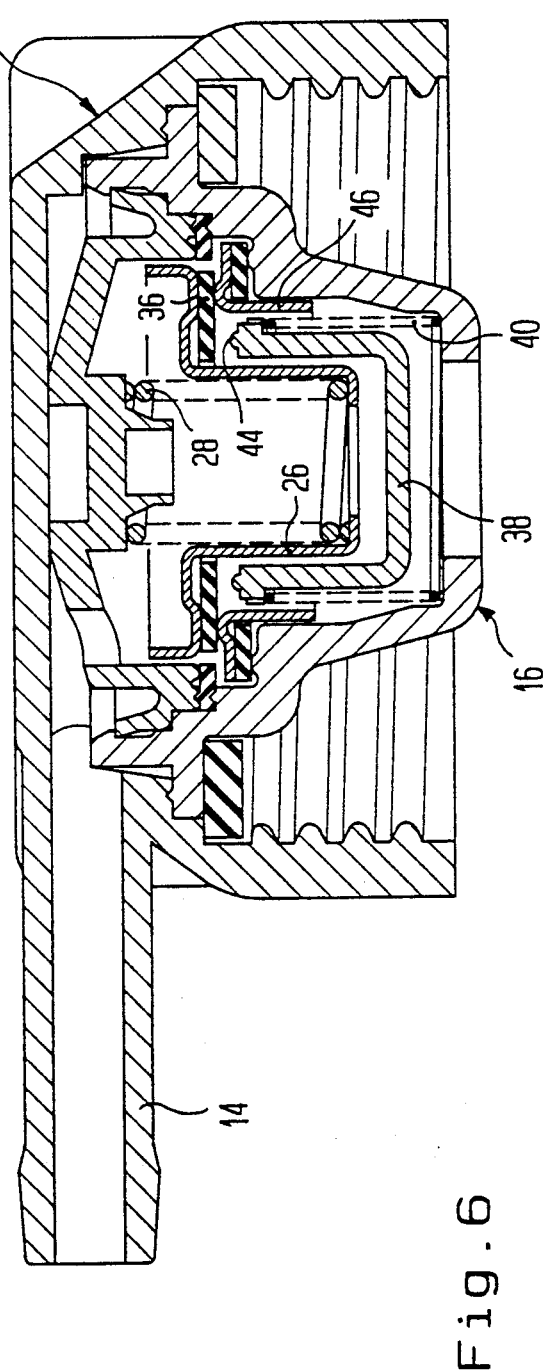

CAP FOR A CONTAINER, ESPECIALLY A VEHICLE RADIATOR

The invention concerns a closure cap for a container, especially a vehicle radiator, with an outer part, a cup-shaped inner part connected with the outer part and insertable into the opening to be closed, and an overpressure valve arranged in the inner part for opening and closing a pressure compensation channel running through the inner part, the overpressure valve having an axially movable first valve body carrying a first ring-shaped substantially radially extending sealing surface which is urged against a ring-shaped first countersealing surface by a spring biasing the valve body in the direction toward the bottom of the inner part (inwardly).

A closure cap of the previously described kind for a vehicle radiator should serve in a known way during the operating phase of a vehicle to provide for a pressure compensation if the pressure, because of the heating of the cooling water in the radiator, rises and reaches or exceeds a critical value. If the vehicle is stopped, because of the heat stored in the engine the overpressure rises further. The danger therefore exists in this case of a large amount of cooling water evaporating or of the radiator boiling to an empty state, so that a considerable amount of cooling water will have to be later refilled into the radiator.

The invention has as its object the provision of a closure cap of the previously mentioned kind which on one hand inhibits a boiling empty of the radiator and on the other hand assures that the radiator will not burst upon a further increase in pressure.

This object is solved in accordance with the invention in that the outwardly directed first countersealing surface is formed on a second valve body axially movable between two end positions, which second valve body has an opening inside the first countersealing surface and radially outside of the first countersealing surface has both an inwardly facing second ring-shaped sealing surface and an outwardly facing third ring-shaped sealing surface, a respective one of which second and third sealing surfaces in each of the two end positions of the second valve body engages an associated one of second and third countersealing surfaces provided on the inner part.

With the solution according to the invention there exists the possibility that the valve, after the rise of the container internal pressure over a first limit value, first opens as in the case of a customary overpressure valve, in which case the second sealing surface is lifted from the second countersealing surface. However, if the pressure increases further both the first and the second valve bodies move together outwardly against the spring pressure until the third sealing surface on the second valve body engages the associated third countersealing surface and thereby again closes the pressure compensation channel. In this way the boiling empty of the container by the usually short term overheating of the container inner space can be avoided. Should however the heat remain longer and the container internal pressure increase further, then the first valve body is lifted from the second valve body, which has reached its end position and which therefore can no longer move further axially outwardly. Thereby the pressure compensation channel is again opened and is thereafter first closed again when the pressure subsides and the first valve body moves axially inwardly under the effect of the spring. With the solution of the invention the opening of the overpressure valve therefore takes place in two stages, having different threshold pressure values, with an intermediate closing of the pressure compensation channel. It is contemplated that several such stages can be connected to one another sequentially in cascade fashion.

An essential feature of the solution of the invention exists in that for this plural staged opening of the overpressure valve several springs are not required whose spring constants have to be exactly determined. The different threshold pressure values are much more determined by the surface ratios of the surfaces to which the pressure is applied on the first and second valve bodies.

Preferably, in the closure cap of the invention the overpressure valve also has combined with it in a way known by itself an underpressure valve, so that in the case where an underpressure appears as for example upon the cooling of the radiator a pressure compensation can likewise be made. In connection with this the construction of the closure ca is such that the first valve body has the shape of a spring cup receiving the spring with an opening in the cup bottom and with a radially outwardly directed flange on which the first sealing surface is provided, that the spring cup is received in a cup-shaped third valve body on whose opening edge a fourth countersealing surface is provided for engagement with the first sealing surface, which fourth countersealing surface is located radially inside of the first countersealing surface and is biased by a second spring engaging the bottom of the inner part against the first sealing surface, and in that the second valve body has the form of a sleeve, surrounding the third valve body, with a radially outwardly directed flange on which the sealing and countersealing surfaces are provided. This arrangement guarantees a very compact construction for the closure cap of the invention.

Further features and advantages of the invention will be apparent from the further dependent claims and the following description, which in combination with the accompanying drawings explain the invention with respect to an exemplary embodiment.

The drawings are:

FIG. 1 A plan view of the outer side of a closure cap embodying the invention.

FIGS. 2 to 6 Each a cap axis containing section taken along the line II—II of FIG. 1, with the valve bodies in the several figures being shown in different positions.

Figure 7:
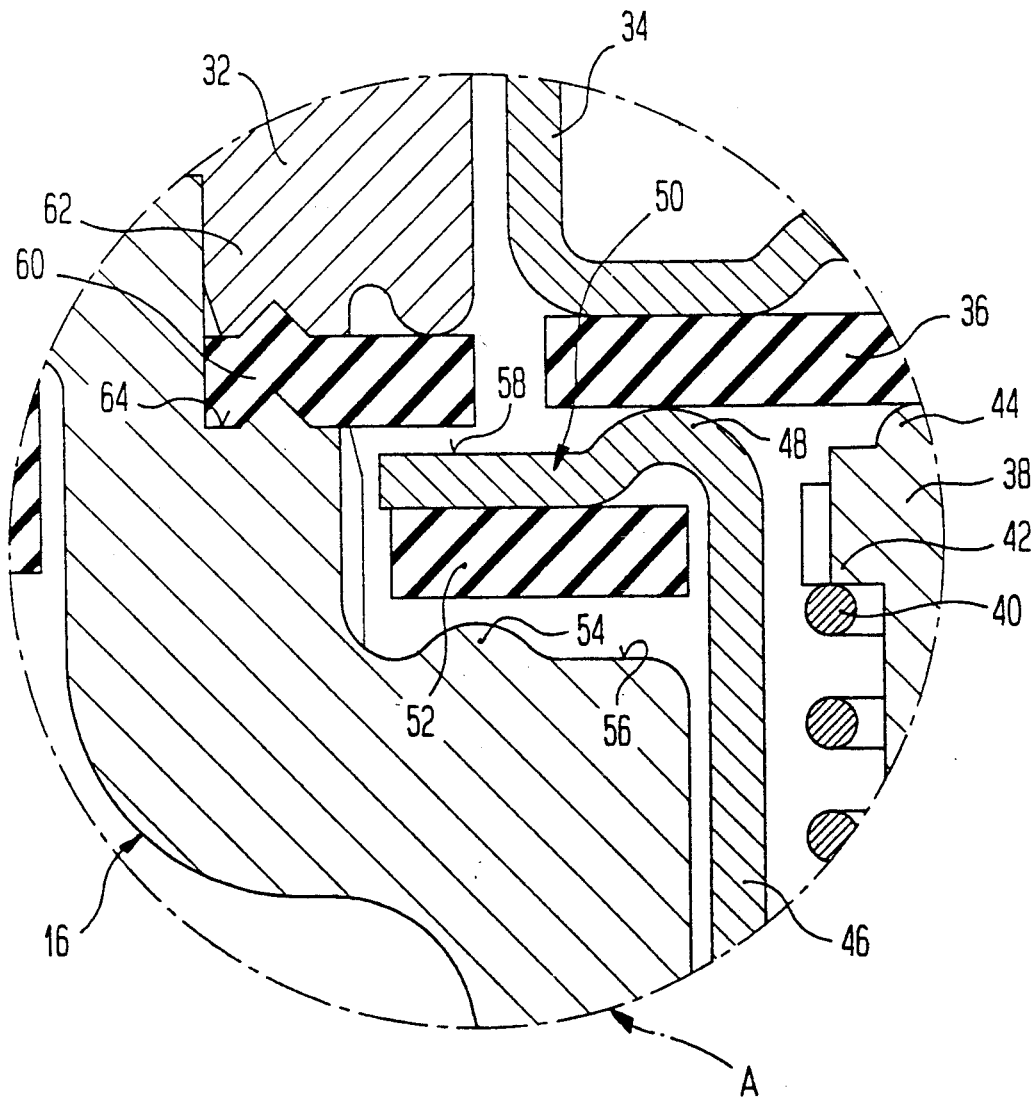

FIG. 7 The portion of FIG. 3 indicated at A in FIG. 3 in enlarged scale.

FIG. 1 shows a plan view of the outside of a radiator cap 10, having a central is 11, with an outer part 12 which by means of a nipple 14 is connectable to a non-illustrated vent hose.

According to FIGS. 3 to 6 the outer part 12 of the cap 10 is connected with a cup-shaped inner part 16, with the connection being made in any desired and suitable way. The inner part 16 is intended for engagement with the opening which is to be closed of a non-illustrated radiator nipple, onto which the outer part 12 is threadable with the help of a threaded portion 18. As a result of this the edge of the nipple comes into engagement with a seal ring 20 arranged between the inner part 16 and th outer part 12, so that the nipple becomes tightly sealed.

Because of the high temperature difference and corresponding pressure difference in the inner space of the radiator between the operating condition of the vehicle and the rest condition of the vehicle the possibility of a pressure compensation between the inner space of the radiator and the surroundings must be provided for. For this purpose an overpressure/underpressure valve, indicated generally at 22, is arranged in the inner part 16, which valve can open and close a pressure compensation channel running between the connecting nipple 14 of the outer part 12 and an opening 24 in the bottom of the inner part 16.

The overpressure/underpressure valve includes in a way known in itself, a spring cup 26 forming a first valve body which receives a first helical compression spring 28. This spring at one end engages the bottom 30 of the spring cup 26 and at its other side engages a closure part 32 which is snapped into the inner part 16 and closes it. The helical compression spring 28 urges the spring cup 26 in the direction toward the bottom of the inner part 16, that is inwardly toward the inner space of the container. The spring cup 26 has a radially outwardly directed flange 34 which carries an elastic sealing ring 36 on its inwardly facing surface normal to the axis of the cap.

The spring cup 26 with its cup portion extends into a closed valve cup 38 forming a third valve body. This third valve body is surrounded by a second helical compression spring 40 which at one end engages the inner part 16 and at its other end engages a radially outwardly directed shoulder 42 of the valve cup 38 and urges the valve cup 38 against the sealing ring 36 through a sealing rib 44 formed on the upper cup edge of the cup 38.

The valve cup 38 is surrounded by a cylindrical sleeve 46 which at its outer end after the formation of a sealing bead 48 transitions into a radially outwardly directed flange 50. The sleeve 46, forming the second valve body, engages the seal ring 36 with its sealing bead 48. On its inwardly facing side the flange 50 carries an elastic sealing ring 52 intended to engage a sealing rib 54 formed on a radial shoulder 56 of the inner part 16. The flange 50 with its outwardly facing radial surface 58 is intended to engage a sealing ring 60 which is clamped between a radial outer edge 62 of the closure part 32 and a shoulder 64 of the inner part 16.

The sleeve 46 is therefore movable axially between a first inward position, determined by the engagement of the sealing ring 52 on the sealing rib 54, and a second end position, determined by the engagement of the flange 50 on the sealing ring 60.

Figure 2:
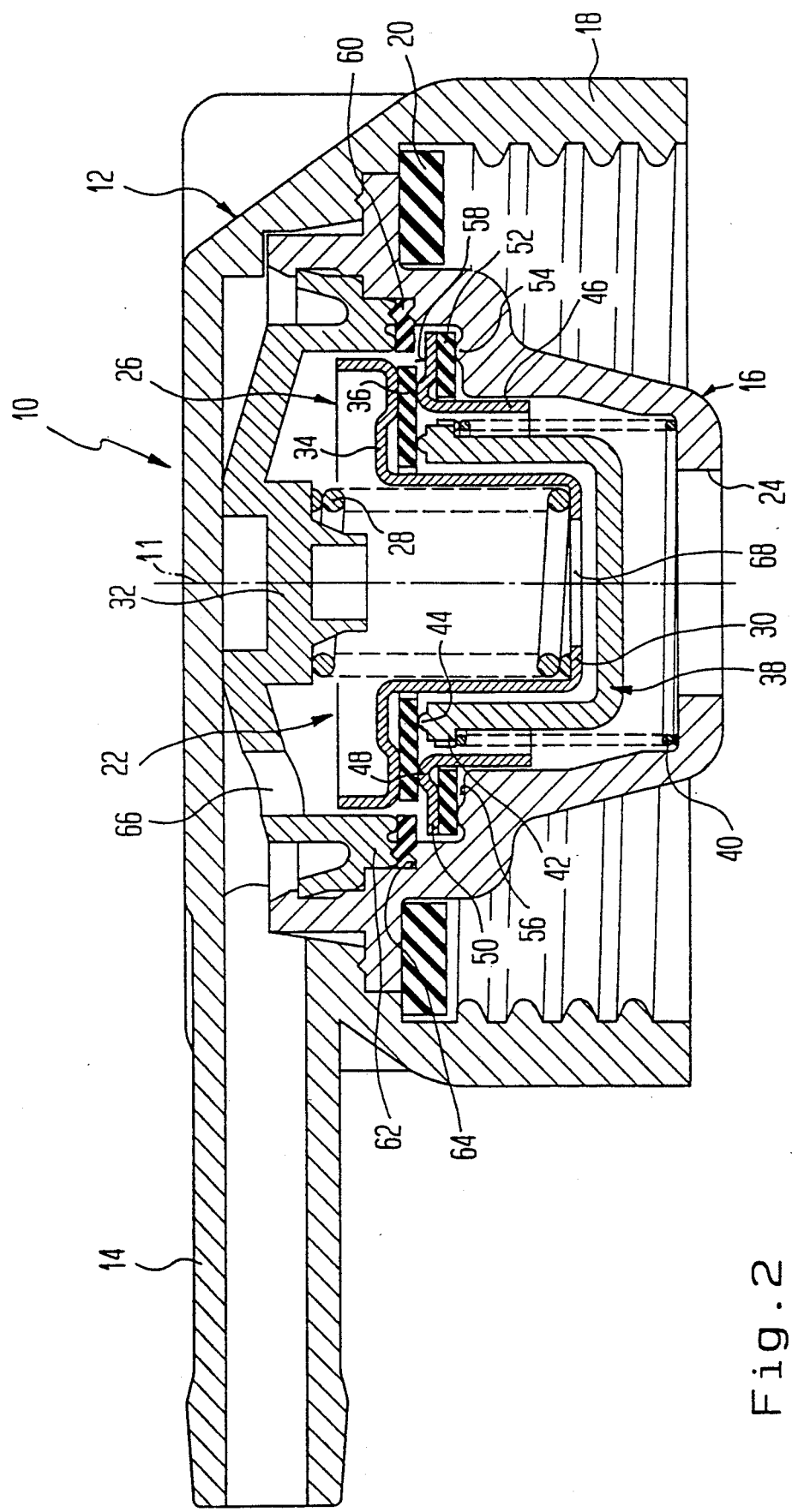

The above described overpressure/underpressure valve of the closure cap operates in the following way:

FIG. 2 shows the valve system in the closed condition, in which the pressure compensation channel is entirely closed. The sleeve 46 lies with its flange 50 and with the sealing ring 52 carried by it on the ring-shaped sealing ring 54 of the inner part. The spring cup 26 standing under the bias of the helical compression spring 28 lies with its sealing ring 36 on the sealing bead 48 of the sleeve 46 and presses this in turn against the sealing rib 54 of the inner part 16. The valve cup 38 is biased by the helical compression spring 40 against the seal ring 36. Therefore, all of the flow through openings of the overpressure/underpressure valve are closed. This position is held throughout a pressure zone lying between an underpressure threshold value and a first overpressure threshold value.

FIG. 3 shows a position in which the overpressure valve opens after the exceeding of the first overpressure threshold value. In this case the overpressure works on a circular surface having the diameter of the sealing rib 54. By means of the overpressure all three valve bodies 26, 38, and 46 are lifted. The sealing ring 52 lifts from the sealing rib 54 so that the flange 50 along with the sealing ring 52 is located in a middle position between its two end positions. This position is illustrated in FIG. 3 and in enlarged scale in FIG. 7. Now a pressure compensation can take place through the opening 24 in the bottom of the part 16, the gap between the sealing rib 54 and the sealing ring 52, around the outer edge of the flange 50, along the outer edge of the flange 34 of the spring cup 26, through an opening 66 in the closure part 32, and to the connecting nipple 14. This condition can for example arise when the vehicle after a long drive is stopped and the stored heat of the motor cannot be sufficiently dissipated. If the temperature and therewith the pressure inside the radiator increase further the three valve bodies are further lifted until the sleeve 46 with its flange 50 reaches its upper end position in which the flange 50 engages the sealing ring 60. At this point the previously described path for the equalization of the overpressure is again closed. In this valve position, which is illustrated in FIG. 4, an emptying boiling of the radiator is avoided.

Should the pressure however rise beyond a further safety threshold value, at the exceeding of which a bursting of the radiator has to be taken into consideration, the high pressure now effects a lifting of the spring cup 26 with its sealing ring 36 from the sealing bead 48 of the sleeve 46, which has reached its axially outer end position and cannot be moved further in the outward direction. Then an overpressure flow can take place through the sleeve 46 and through the intermediate space between the sealing ring 36 and the sealing ring 48. This path also remains open with a further increase in pressure and is first closed again upon a decrease in pressure. This second open position of the overpressure valve is illustrated in FIG. 5.

FIG. 6 illustrates the case in which a low pressure threshold value is fallen below. In this case the valve cup 38 is pulled against the force of the spring 40 by the low pressure in the radiator so that the upper edge of the valve cup 38 with its ring-shaped sealing rib 44 is lifted from the sealing ring 36 of the spring cup 26 which cannot follow this movement since the spring cup 26 together with the sleeve 46 is held up by the shoulder 56 of the inner part 16. Now a low pressure compensation can take place through the opening 24 in the bottom of the inner part 16 through the gap between the sealing rib 44 and sealing ring 36 and through an opening 68 in the bottom of the spring cup 26.

It is essential in the previously described solution, that the plural staged opening of the overpressure valve is achieved by the simplest means without additional springs and with the least additional space requirement. By means of a further valve body corresponding to the sleeve 46 and located between the sleeve 46 and the inner part a further overpressure opening stage can be provided. These stages can also be sequentially switched in plural cascade fashion.

It is to be understood that the previously described cap is not only suited for radiators but is also suited for all containers in which similar coarse pressure differences occur as they do in vehicle radiators.

I claim:

1. A closure cap for a container such as a vehicle radiator having an opening to be closed by said cap, said cap having a central axis and comprising an outer part, an inner part connected with said outer part and insertable into said opening, said inner part having a pressure compensation channel running therethrough, and an overpressure valve arranged in said inner part for opening and closing said pressure compensation channel, said overpressure valve having an axially movable first valve body having a firs ring-shaped substantially radially extending sealing surface, and a second valve body axially movable between two end positions and having a ring-shaped first countersealing surface ad an opening radially inside of said firs countersealing surface, mean for biasing said sealing surface of said first valve body against said ring-shaped first countersealing surface of said second valve body, said second valve body also having radially outside of said first countersealing surface a second ring-shaped sealing surface facing inwardly toward the interior of said container when said cap is attached to said container and having a third ring-shaped sealing surface facing outwardly away from the interior of said container said inner part providing second and third countersealing surfaces cooperable respectively with said second and third sealing surfaces, said first and second valve bodies being so constructed and arranged that a respective one of said second and third sealing surfaces in each of said two end positions of said second valve body lies against the respectively associated one of said second and third countersealing surfaces provided by said inner part.

2. A closure cap according to claim 1, further characterized in that the firs valve body has the form of a spring cup, said means for biasing said first sealing surface of said first valve body against said ring-shaped first countersealing surface of said second valve body being a spring received in said spring cup, said spring cup having a bottom with an opening and also having a radially outwardly directed flange on which said first sealing surface is provided, said spring cup being receive in a cup-shaped third valve body having an opening edge providing a fourth countersealing surface for engagement with said first sealing surface, which fourth countersealing surface if located radially inside of said first countersealing surface, a second spring engaging said inner part and said third valve body for biasing said fourth countersealing surface against said first sealing surface, and said second valve body being provided in the form of a sleeve surrounding said third valve body which sleeve has a radially outwardly directed flange providing said second ring-shaped sealing surface, said third ring-shaped sealing surface, and said first countersealing surface.

3. A closure cap according to claim 1 further characterized in that in each recited instance of one of said sealing surfaces being engagable with one of said countersealing surfaces one of the involved surfaces is formed by an elastic sealing ring held by one of said valve bodies or said inner part and the other involved surface is formed on an associated one of said valve bodies or on said inner part.

4. A closure cap according to claim 2 further characterized in that in each recited instance of one of said sealing surfaces being engagable with one of said countersealing surfaces one of the involved surfaces is formed by an elastic sealing ring held by one of said valve bodies or said inner part and the other involved surface is formed on an associated one of said valve bodies or on said inner part.

* * * * *